United States Patent [19]
Brinkmeyer et al.

[11] Patent Number: 5,940,007
[45] Date of Patent: Aug. 17, 1999

[54] REMOTE CONTROL SYSTEM FOR MOTOR VEHICLE RELATED DEVICES

[75] Inventors: Horst Brinkmeyer, Waiblingen; Arthur Hipp, Kirchheim; Daniel Hoffmann, Esslingen; Günter Schwegler, Weinstadt; Dirk Weigand, Leipzig, all of Germany

[73] Assignee: Mercedes-Benz AG, Germany

[21] Appl. No.: 08/804,884

[22] Filed: Feb. 24, 1997

[30] Foreign Application Priority Data

Feb. 24, 1996 [DE] Germany ............... 196 07 017

[51] Int. Cl.$^6$ ............ G06F 7/04; G08C 19/00; H02H 7/18
[52] U.S. Cl. ............ 340/825.69; 340/825.72; 340/825.31; 307/10.7
[58] Field of Search ............ 340/825.3, 825.22, 340/825.69, 825.72, 825.31, 825.34; 380/21, 22, 23; 370/93, 96, 13; 307/10.7, 10.2, 10.3, 10.4, 10.5, 10.6

[56] References Cited

U.S. PATENT DOCUMENTS

| | | | |
|---|---|---|---|
| 4,809,268 | 2/1989 | Tejima et al. | 370/93 |
| 4,988,992 | 1/1991 | Heitschel et al. | 340/825.69 |
| 5,528,086 | 6/1996 | Maas et al. | 307/10.5 |
| 5,661,804 | 8/1997 | Dykema et al. | 380/21 |
| 5,686,904 | 11/1997 | Bruwer | 340/825.3 |

FOREIGN PATENT DOCUMENTS

| | | |
|---|---|---|
| 3225754 | 1/1984 | Germany . |
| 3043627 | 12/1987 | Germany . |
| 4003280 | 8/1991 | Germany . |
| 4018261 | 8/1991 | Germany . |
| 4215221 | 11/1993 | Germany . |
| 0617183 | 9/1994 | Germany . |
| 4411450 | 3/1995 | Germany . |
| 9015211 | 12/1990 | WIPO . |

*Primary Examiner*—Michael Horabik
*Assistant Examiner*—Jean B. Jeanglaude
*Attorney, Agent, or Firm*—Evenson, McKeown, Edwards & Lenahan, P.L.L.C.

[57] ABSTRACT

A system and method for operating a remote control having a portable remote control unit which can control at least one function unit. The remote control unit and the function unit are connected with one another by way of a bidirectional data communication link, by which data can be transmitted by means of a symmetrical coding method. The remote control unit sends a learn mode reporting signal in a secret coding information learn mode to the controllable function unit which, in the learn mode, in turn, sends back an acknowledgment signal. Upon receipt of the acknowledgment signal, the remote control unit generates new secret coding information by means of the coding algorithm, as a function of basis secret coding information and of the previous secret coding information, and sends the new secret coding information to the function unit. The function unit then replaces the previous secret coding information with the new secret coding information and emits an acknowledgment signal, upon the receipt of which the remote control unit, in turn, replaces the previous secret coding information with the new secret coding information.

6 Claims, 4 Drawing Sheets

REMOTE CONTROL SYSTEM FOR MOTOR VEHICLE RELATED DEVICES

BACKGROUND AND SUMMARY OF THE INVENTION

This invention relates to a remote control system having a portable remote control unit for controlling at least one function unit, and a bidirectional data communication path for transmitting symmetrically encoded data between the remote control unit and the function unit, and to an operating process for such a system.

Code protected remote control systems of this type are used, for example, for motor vehicles and external motor-vehicle-related devices, such as garage door openers, to limit access to a selected group of authorized users. Authorized users establish their usage authorization to the respective controllable function unit by the fact that they are in the possession of an authorizing remote control unit. The remote control unit triggers a bidirectional code data exchange in which the pertaining authorization code is transmitted between the two units in a coded manner, and is subsequently examined for its conformity and therefore usage authorization. The use of a symmetrical coding method, which presupposes the presence of identical secret coding information in both units, offers a high degree of protection against attempts by unauthorized persons to control the function unit themselves, after having listened to such a code data exchange.

German published patent application DE 32 25 754 A1 discloses a remote control method and apparatus of this type, in which the secret coding information of the symmetrical coding method is a mathematical function, which is stored in an identical and unchangeable manner, on the one hand, in a key part and, on the other hand, in a lock part.

In cryptography, the so-called DES (Data Encryption Standard) algorithm is known, among others, as a very safe algorithm for symmetrical coding methods. German patent document DE 44 11 450 C1, for example, discloses a vehicle safety device with an electronic usage authorization coding for implementing a replacement key, instead of an asymmetrical coding method for a protected code data exchange in which only one of the two mutually communicating units must contain secret coding information.

In various cases, it is known to use a portable remote control unit in the form of an electronic vehicle key. The key not only authorizes access and/or usage of a motor vehicle, but also controls other vehicle function units or other function units, such as a garage door opening. For this purpose, in a representative manner, reference is made to German patent documents DE 30 43, 627 C2, DE 40 18 261 C1 and DE 42 15 221 C2 as well as to German published patent application DE 40 03 280 A1.

German published patent application DE 41 02 020 A1, discloses a remote control system having a vehicle key which is configured for bidirectional information exchange with the vehicle to control locking and unlocking elements of the vehicle. In addition, it also has a visual display unit for displaying information concerning driving condition parameters transmitted from the vehicle, such as the condition of the vehicle doors, driven mileage and level in the fuel tank, as well as additional non-vehicle parameters, such as the time of day and the condition of the key battery.

European published patent application EP 0 617 183 A2, discloses a vehicle remote control system with a key that has a voice memory, a microphone and a voice playback unit. Information, such as the number of a parking space where the vehicle is situated, can be fed in voice form into the key and stored there, after which this information can be retrieved from the key in voice form by the user.

Published patent application WO 90/15211 describes a remote control system of the initially mentioned type, for transmitting data which contain a random number, coded for example by means of the DES coding method, between the remote control unit and the function unit. The pertaining secret coding information can be changed in the remote control unit by bringing the latter together with an additional coding unit into which the user must first input the previous secret coding information to prove his authorization. If the code conformity test is successful, the user can feed new secret coding information into the remote control unit by way of the coding unit. The transmission of the new secret coding information into the function unit takes place after a normal authentication operation in which a negative result has occurred because of the secret coding information, which so far has been changed only in the remote control unit. The function unit will then change to a learn mode and, by way of the DES coding method, will retrieve the new secret coding information from the remote control unit.

In the remote control system described in U.S. Pat. No. 4,988,992, authorization codes of at least one. remote control unit can be transmitted to at least one function unit. In order to change the respective authorization code as required, the corresponding remote control unit is first brought into a programming mode which activates a random code generator provided there. The random code is stored in the remote control unit as a new authorization code. Additional remote control units can be synchronized by activating a learn mode, in which they can receive the new authorization code from the newly programmed remote control unit by way of a special antenna, if the remote control unit is brought into the direct vicinity and is caused to send the new authorization code. For entering the new authorization code into the respective function unit, a programming mode is activated on it, after which the function unit will, for a given time period, be enabled to receive a new authorization code which does not correspond to its previously stored code. A code received within this time period will then be stored by the function unit as a new authorization code.

One object of the invention is to provide a remote control system and process of the initially mentioned type which requires relatively low expenditures, and in which the secret coding information used for the applied symmetrical coding method can be changed in a simple manner that is protected from manipulation.

This problem is solved by means of a remote control system according to the invention, in which the learning operation for replacing previous secret coding information with new secret coding information is both simple and secure. When the learn mode is activated, the remote control unit automatically calculates new secret coding information, preferably by means of a pseudorandom operation. Since the secret coding information remains hidden even to the rightful owner of the remote control unit, he is not burdened with inputting it. Because new secret coding information can be generated upon request, the learn mode can be repeated as often as desired for the purpose of selecting new secret coding information. Because of the learning activation, and because the secret coding information can be replaced only in the function unit, after acknowledgment of secret coding information by the function unit to the remote control unit, it is ensured that the generation of new secret coding information triggered by an unauthorized person, on the one hand, remains useless to him (since the function unit continues to require control by means of the old secret coding information) and, on the other hand, the authorized user will be able to continue to control the function unit by means of the remote control unit on the basis of the old secret coding information, which remains valid. Alternatively, it is also possible to preclude the generation of new secret coding information in the remote control unit when the function unit is not activated. The function unit should be guarded against access by unauthorized persons, and activation of the learn mode at the function unit should be protected by suitable locking; for example, by means of a key switch.

In one embodiment of the invention, at least one vehicle-side function unit (such as an auxiliary heater) and at least one function unit outside the vehicle (such as a garage door opener) can be controlled by the remote control unit. Furthermore, in a reversed data transmission direction, condition information, particularly with respect to the respective function unit, can be transmitted to the remote control unit and can be indicated there visually and/or acoustically.

In another embodiment, separate secret coding information for the coding algorithm in the remote control unit is assigned to each of the function units which can be controlled by the remote control unit. Thus, the secret coding information for various controllable function units can be changed independently of one another.

In still another embodiment, the controllable function unit can be switched between several learn mode channels, each of which is used to establish secret coding information for data communication with a specific remote control unit. In this manner, the function unit can be controlled by several authorizing remote control units, each with respective specific secret coding information.

Finally, in yet another embodiment of the invention, the so-called DES (Data Encryption Standard) algorithm for the symmetrical coding method is used. This arrangement permits particularly secure data communication between the remote control unit and the controllable function unit, at expenditures which are acceptably low.

Other objects, advantages and novel features of the present invention will become apparent from the following detailed description of the invention when considered in conjunction with the accompanying drawings.

DETAILED DESCRIPTION OF THE DRAWINGS

Figure 1:
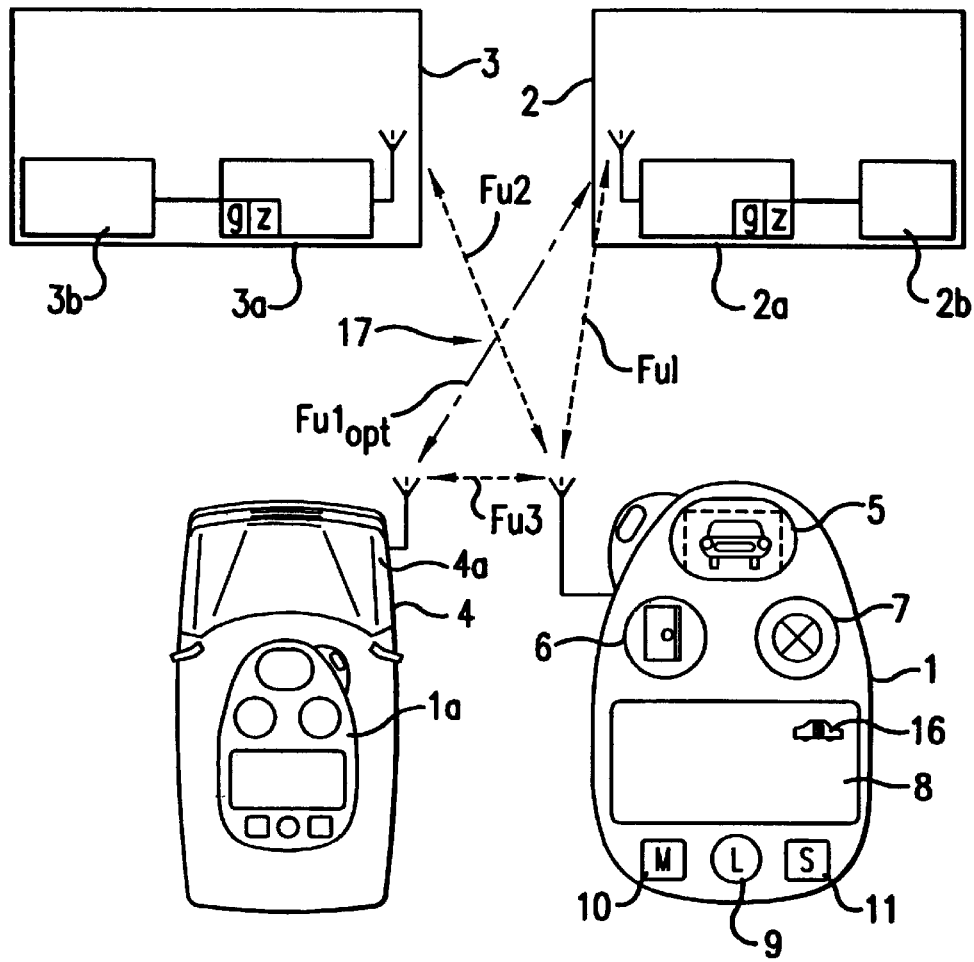
FIG. 1 is a block diagram of a remote control system for controlling devices situated both inside and outside of a motor vehicle, by way of a portable remote control unit in the form of a key tag.

FIG. 1 is a block diagram which shows an overview of a remote control system according to the invention, in which a portable remote control unit is provided in the form of a key tag 1. A bidirectional radio data communication path 17, having three radio channels (Fu1, Fu2, Fu3), provides a data exchange connection between the key tag 1 and a transmitting/receiving device 2a of a garage door opener 2 assigned to a vehicle garage, a transmitter/receiver 3a of a house 3 or a transmitter/receiver 4a of a vehicle 4, in each case via an assigned one of the three radio channels (Fu1, Fu2, Fu3), according to the operating of pertaining function keys.

The key tag 1 can control the devices outside the vehicle via the pertaining radio channels (Fu1, Fu2) even when it is situated in the vehicle interior, as indicated by the illustrated position 1a. In the latter case, data communication takes place completely independently of the vehicle 4 and its transmitter/receiver 4a. It is also possible to improve the transmission characteristics, however, by converting the signals of the key tag 1a to the transmitter/receiver unit 4a of the vehicle, which then communicates with the transmitter/receiver device of the garage door opener by way of an optional radio channel ($fu1_{opt}$) indicated by a dash-dotted line in FIG. 1. Of course, a different type of wireless data communication, for example, by infrared waves, can also be used.

The transmitter/receiver 2a of the garage door opener 2 has a switching output arranged in parallel to an operating element in the interior of the garage (not shown), which also controls a garage door actuator 2b. Thus, the motorized garage door opener can be actuated to open and close the garage door by either the key tag 1 or the operating element in the garage interior. By means of a switching output, the transmitter/receiver device 3a in the house 3 controls an electro-mechanical door opener 3b for the door of the house 3, so that opening of the door can be released or blocked via the key tag 1. It should be understood of course that, as required, the two transmitters/receivers 2a, 3a (of the garage door opener 2 and of the house 3 respectively) can also be combined to form a single, multi-channel transmitter/receiver. The transmitter/receiver 4a in the vehicle 4 is connected with the other components of the electric system of the vehicle, via a data bus system (not shown).

Figure 2:
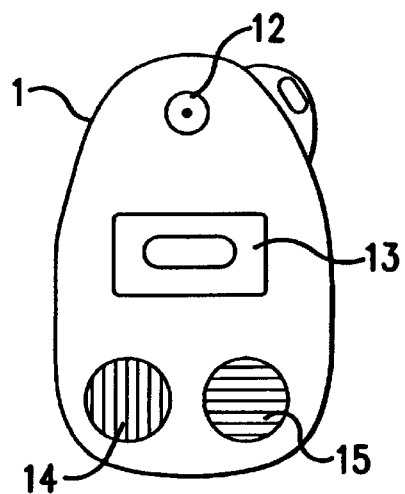
FIG. 2 is a schematic rear view of the key tag of FIG. 1.

The key tag 1, which operates as a portable remote control unit, as illustrated in the front view of FIG. 1 and in the rear view of FIG. 2, has several functions. A function key 5 on the front side triggers data communication to control the garage door opener 2, while another function key 6 controls the house door opener 3b. A third function key 7 may have a freely selectable radio remote control function, for which a suitable data protocol has previously been entered, such as switching on a yard light. Alternatively, such a yard light can also be switched on by means of another assigned communication channel in the transmitter/receiver 2a of the garage door opener 2. In this variant, no separate radio data protocol need be fed.

The key tag 1 also has a display 8 which can be illuminated by an illumination key 9. When a menu key 10 is operated, the display 8 presents a menu (which has previously filed functions inside the vehicle), from which a desired function can be selected by operating a setting key 11. In the illustrated embodiment of FIG. 1, the control of an auxiliary heater is shown as such a function, by a corresponding signal 16 which appears on the display 8. The selected functions inside the vehicle are controlled via the radio channel (Fu3) between the key tag 3 and the vehicle 4. For this purpose, the vehicle-side transmitter/receiver 4a transmits the corresponding control commands via the data bus system to the respective vehicle target component.

As illustrated in FIG. 2, the key tag 1 has a function key 12 on its rear side, which is used to select a learn mode, and will be explained further below. Another function key 13 used is a so-called panic key. Both of these function keys 12, 13 are protected from unintentional operation by arranging them in a recess, or by providing them with a comparatively hard pressure point.

Operation of the panic key 13 triggers an alarm system situated in the vehicle. Also, if the vehicle is equipped with an antitheft system having a car telephone and a locating system, such as the GPS (Global Positioning System), the panic button can be used to make an emergency call. Further, a speaker 14 and a microphone 15 arranged on the rear side of the key tag 1 provide a voice recording and replay. Specifically, for example, information concerning the vehicle location can be entered in voice form and retrieved later. This function is particularly useful in the case of multiple users of the vehicle 5 in a motor vehicle fleet.

In addition, the display 8 may also provide information concerning the condition of the function elements controlled by the key tag 1 (such as of the garage door opener 2, the house door opener 3b and the auxiliary vehicle heater), or other information which is transmitted to the key tag 1 via the transmitter/receiver devices 2a, 3a, 4a and the bidirectional data communication path 17. For example, vehicle data, such as the mileage and the fuel tank content can also be shown on the display 8, which is a special advantage where the vehicle is used by several drivers, as in the case of car rental agencies and so-called car sharing pools. Likewise, in this manner, as required, the locking state of the vehicle doors can be transmitted by the vehicle-side transmitter/receiver 4a and the pertaining radio channel (Fu3) to the key tag 1, and be shown there on the display 8.

As a further advantageous function of the remote control device, it can be provided that, when the vehicle antitheft system is triggered because of a theft attempt, a corresponding information signal is transmitted by the transmitter/receiver unit 4a of the vehicle 4 via the pertaining function channel (Fu3) to the key tag 1. The key tag 1 will then emit a corresponding report concerning the attempted theft visually on the display 8 and/or acoustically by way of its speaker 14.

In order to prevent a misuse of the remote control system by unauthorized persons, data communication between the key tag 1 and the transmitters/receivers 2a, 3a, 4a is protected by a usage authorization which must be satisfied as a prerequisite for properly receiving or processing data signals, such as a control signal for the garage door opener 2, the house door opener 3b or the auxiliary vehicle heater. In order to verify the authorization of the operated key tag 1 to control the desired function unit, the remote control unit of FIG. 1 uses a symmetrical coding method based on the so-called DES (Data Encryption Standard) algorithm. The safety of the DES algorithm does not depend on keeping the algorithm per se secret, rather secret coding information (g) used in the coding algorithm is protected from disclosure. Such secret coding information is stored in both the key tag 1 and the transmitter/receiver devices 2a, 3a, 4a of the controlled function units. The coding algorithm generates a random number (z) as a function of this secret coding information (g) and further (optional) nonsecret parameters.

Figure 3:
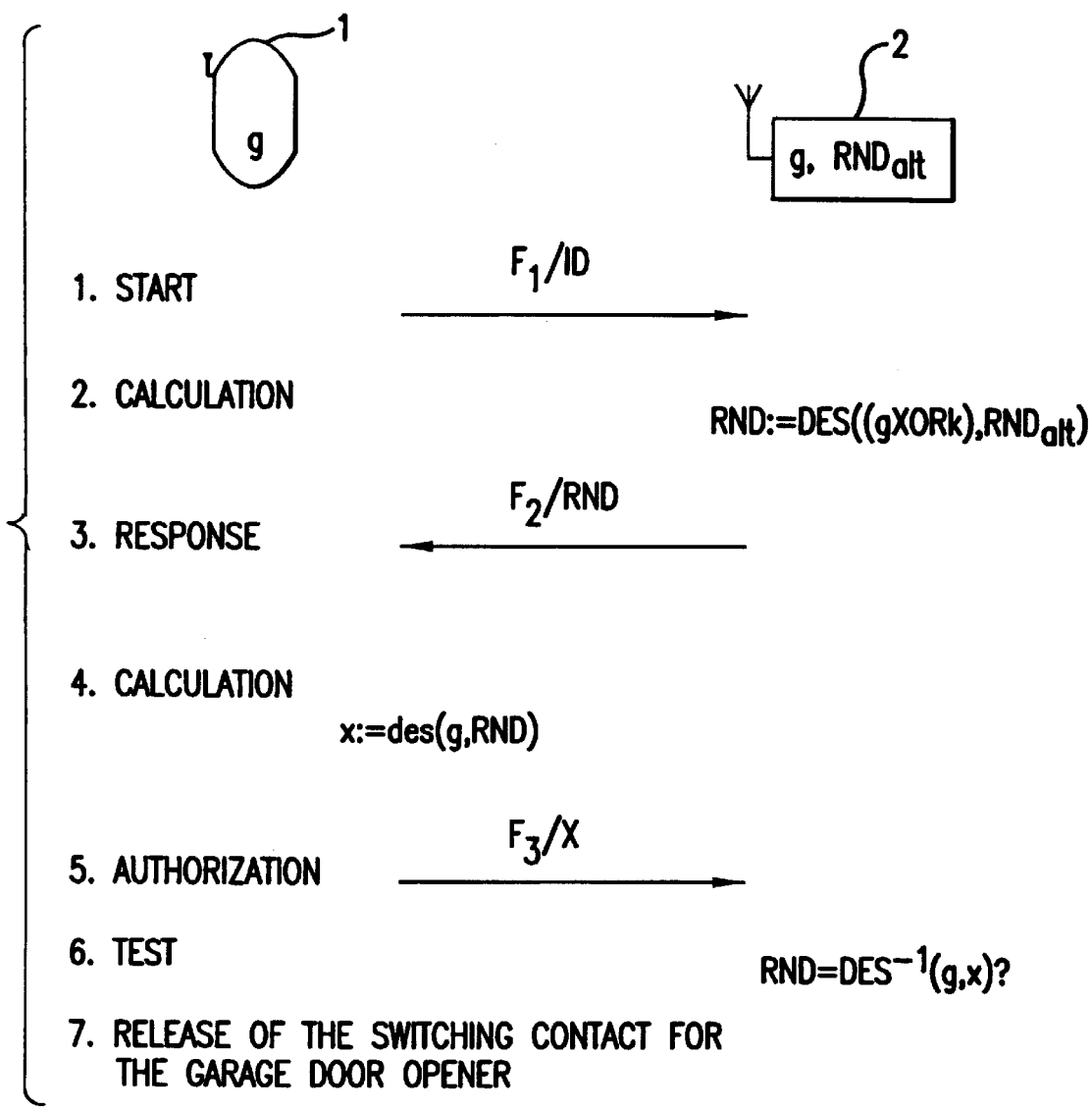
FIG. 3 depicts an authentication communication with the system of FIG. 1, between the key tag and a garage door opener.
Figure 4A:
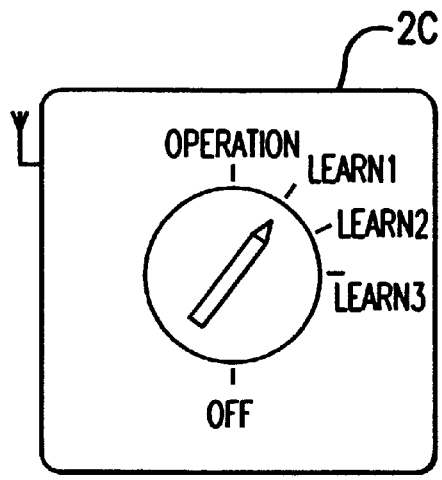
FIG. 4 depicts the operating steps in a key secret learning operation between a modified key tag as a portable remote control unit and the garage door opener of the system of FIG. 1.
Figure 4B:
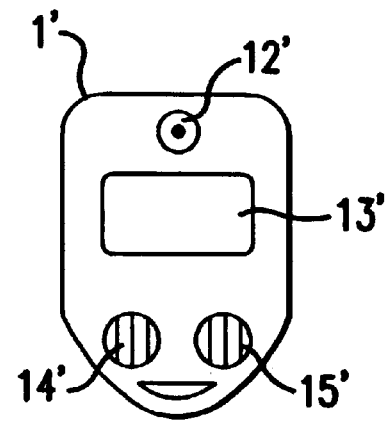
Figure 4C:
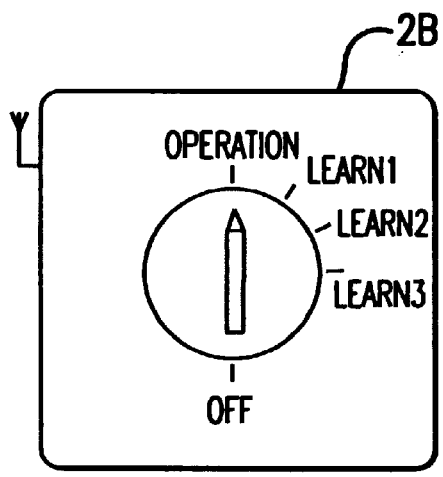
Figure 4D:
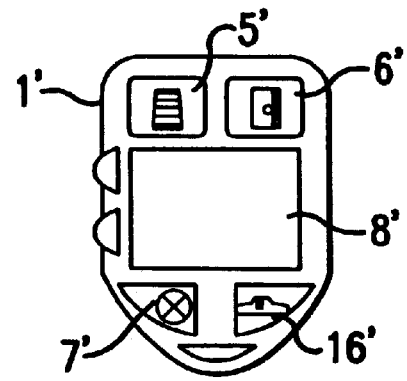

For example, FIG. 3 illustrates the steps followed in a typical authentication operation between the key tag 1 and the garage door opener 2. As the starting step, the pertaining function key 5 (FIG. 1) of the key tag 1 is operated, causing the key tag to emit a function code ($F_1$), together with a key identity code (ID). Upon the receipt of this information, the transmitter/receiver 2a of the garage door opener 2 is activated, 2a calculates a random number (RND) using the DES algorithm, as a function of the previously stored secret coding information (g), XOR-linked with an 8-byte constant (k), and a previously valid random number ($RND_{old}$). Because of its random characteristics, the DES algorithm is particularly suitable for use as a pseudorandom generator. The XOR-linking of the secret coding information (g) with the constant (k) provides an additional increase in safety so that, by means of the selected algorithm the system achieves optimum safety, simple logistics and ease of handling.

After the calculation, the transmitter/receiver of the garage door opener 2 transmits the random number (RND) (optionally preceded by a pertaining function code ($F_2$)) as a response signal, back to the key tag 1. The key tag 1 then codes the random number (RND) using the DES algorithm and the secret coding information (g). The coding text (x) determined in this manner (optionally preceded by a function code ($F_3$)) is sent back to the garage door opener 2. The transmitter/receiver of the garage door opener 2 uses the coding text (x) and the secret coding information (g), applying the inverse DES algorithm to determine the contained plain text information. It then examines the result to determine whether it corresponds to the previously generated and emitted random number (RND). If a match is determined to exist, it is concluded that the signal has been sent by an authorized control of the garage door opener 2, so that the transmitter/receiver 2a releases a pertaining switching contact to control the garage door actuator 2b.

A special advantage of the remote control system according to the invention is that the secret coding information (g) used for the symmetrical coding method can easily be reset as often as desired, in order to assign usage authorization for one of the controllable function units to a particular key tag. For this purpose, a secret coding information learning operation is carried out, which will be explained in detail in the following by means of FIGS. 4 and 5.

Figure 5:
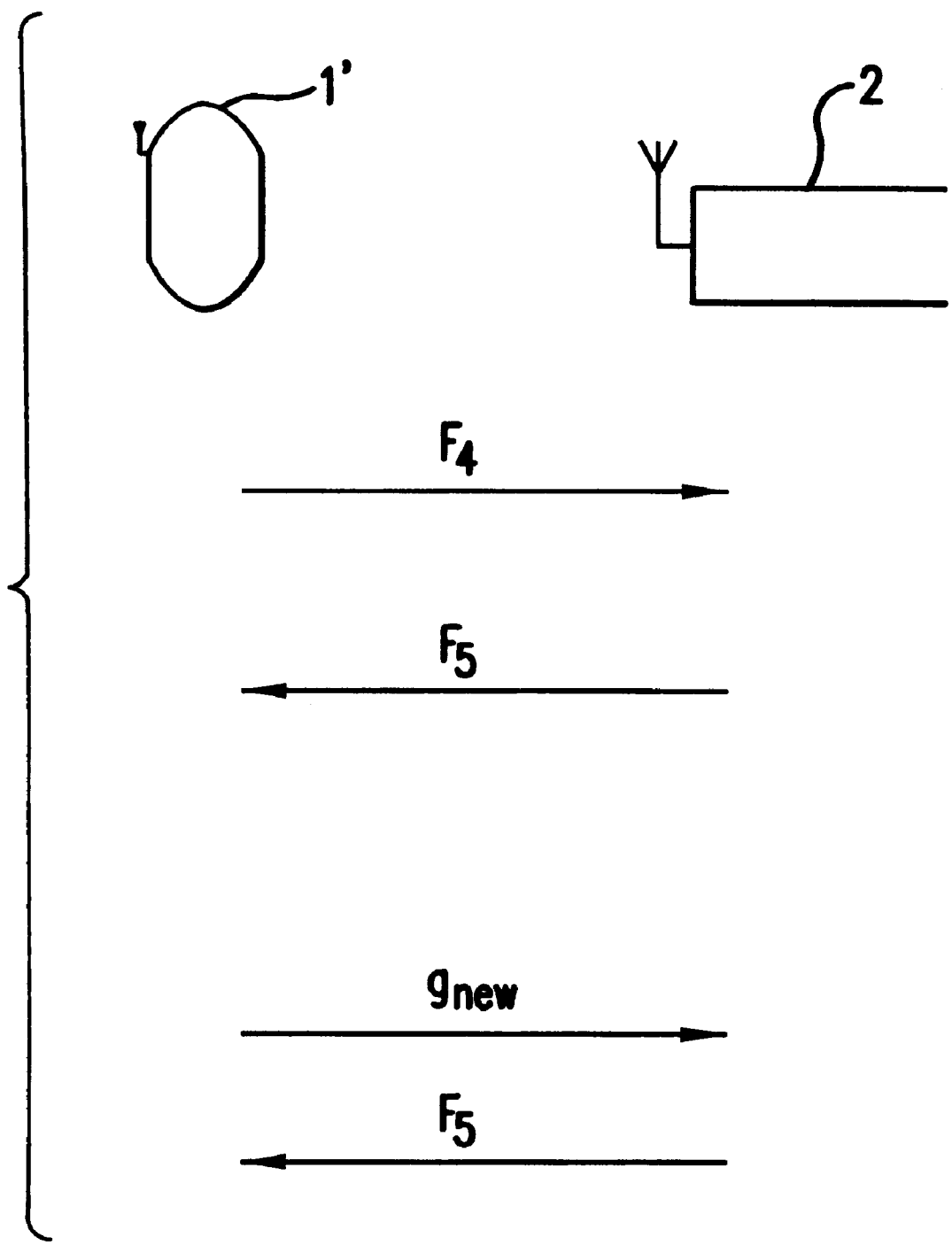
FIG. 5 shows the communication sequence during the learning operation according to FIG. 4.

As an example, FIGS. 4 and 5 illustrate a learning operation between a key tag 1' (slightly modified in comparison to that of FIGS. 1 and 2), and a garage door opener corresponding to that in FIG. 1, of which only a pertaining selection switch 2c is shown in FIG. 4. The selection switch 2c has an "off" position in which the garage door opener is switched off, an "operating" position in which the garage door opener operates normally for controlled opening and closing of the garage door, and three learn mode positions ("learn 1", "learn 2" and "learn 3"). The latter corresponds respectively to three parallel learning channels by way of which three different variants of the secret coding information can be assigned to the garage door opener from three different key tags, so that the garage door opener can be controlled by any of these three key tags.

The modified key tags 1', in turn, contain a learn mode function key 12', a panic key 13', a loudspeaker 14' and a microphone 15', on the back side, and a display 8', a function key 5' (for controlling the garage door opener), a function key 6' (for controlling the house door opener) and a freely allocatable function key 7' (which can be programmed, for example, for the switching-on and switching-off of a yard light) on the front side. In the modified key tags 1 shown in FIG. 4, another function key 16' is arranged for direct control of the auxiliary vehicle heater (instead of selection by way of a menu as provided in the key tags 1 according to FIGS. 1 and 2).

The operating steps of the secret coding information learning process are illustrated in FIG. 4, while FIG. 5 shows the communication sequence. By means of this process the garage door opener 2 learns new secret coding information ($g_{new}$) from a key tag 1', as follows. First, the learn mode is activated for the corresponding key tag 1' by moving the selection switch 2c on the transmitter/receiver of the garage door opener 2 into the pertaining learning channel (for example, the "learn 1" position). Similarly, the learn mode is activated in the corresponding key tag 1' by pressing the learn mode function key 12'. Subsequently, the function key 5' associated with the function unit which is to learn the new secret coding information (here the garage door opener 2), is operated, causing the key tag 1' to emit a corresponding function code ($F_4$) as the learn mode reporting signal. If at this time the remote station (that is, the garage door opener 2) is properly in the learn mode, it will acknowledge reception of the function code ($F_4$) by emitting a learn mode acknowledgment signal in the form of a response function code ($F_5$). Only if such an operating signal ($F_5$) is properly received will the key tag 1' use the DES algorithm to generate new secret coding information ($g_{new}$) as a pseudo-random number with good random characteristics, based on a basis secret coding information ($g_{basis}$) (initially entered therein during the production) and the previously valid secret coding information (g).

During the first-time assignment of secret coding information, the initially entered secret coding information ($g_{basis}$) is used as previous secret coding information. Because the receipt of an acknowledgment message by the key tag 1' is necessary to implement the learning process, an eliciting of the secret coding information from the key tag 1' without the remote station is impossible. Thus, the secret coding information would be useless for an unauthorized person because the garage door opener 2 would continue to be openable only by means of the previous secret coding information (g). In the case of such a change of the secret coding information only in the key tag 1', however, the authorized user would also no longer be able to control the garage door opener 2 by means of the key tag 1'.

In order to deal with this possibility, the newly generated secret coding information ($g_{new}$) is subsequently transmitted to the garage door opener 2. After the reception and storage of the new secret coding information ($g_{new}$), optionally while replacing previously assigned secret coding information (g), the transmitter/receiver of the garage door opener 2 acknowledges such proper implementation by emitting a corresponding acknowledgment function code ($F_6$). The key tag 1' erases the previously valid secret coding information (g) and replaces it with the new secret coding information ($g_{new}$) only upon the reception of this acknowledgment signal ($F_6$). In addition, the key tag 1' also provides the user with a visual and/or acoustic acknowledgment by means of the display 8' or the loudspeaker 14'. It is understood that, as required, all other above-mentioned operating actions and acknowledgments can also be displayed on the display 8' of the key tag 1'. The selection switch 2b of the garage door opener 2 is then changed over to normal operation, so that the learn mode is deactivated and the garage door opener 2 can be controlled by the key tag 1' by means of data communication operations which contain a coding based on the new secret coding information ($g_{new}$). The learning operation is automatically deactivated in the key tag 1' after reception of the acknowledgment signal ($F_6$) of the garage door opener 2.

As demonstrated, the described secret coding information learning method makes is possible to assign a portable remote control unit, on the one hand, and a function unit which can be controlled by it, on the other hand, to one another in a usage authorizing manner, with a change of the secret coding information which can be repeated as often as desired. Control of the function unit by the remote control unit includes an extremely safe authentication process by means of a symmetrical coding method which uses this secret coding information. In this manner, several usage authorizing remote control units can be assigned to a particular function unit, and inversely several function units can be controlled by a particular remote control unit.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Remote control system having a portable remote control unit, at least one function unit which is controlled by way of the remote control unit, and a bidirectional data communication link which transmits coded data between the remote control unit and the function unit, said coded data being generated by a symmetrical coding method using secret coding information stored in said portable remote control unit and said at least one function unit, wherein:

when a secret coding information learn mode is activated, the remote control unit emits a learn mode reporting signal;

upon the receipt of the learn mode reporting signal, the function unit emits a learn mode acknowledgment signal;

upon the receipt of the learn mode acknowledgment signal, the remote control unit, by means of the coding algorithm of the symmetrical coding method, as a function of secret coding information previously stored in said remote control unit, determines new secret coding information and sends said new secret coding information to the function unit;

after the receipt of the new secret coding information, the function unit replaces the previously stored secret coding information with the new one and sends an acknowledgment signal to the remote control unit; and upon the receipt of the acknowledgment signal, the remote control unit replaces the previously stored secret coding information with the new secret coding information.

2. Remote control system according to claim 1 wherein the remote control unit controls at least one vehicle-side function unit and at least one function unit outside the vehicle has a device for indicating information to be transmitted by way of the bidirectional data communication path.

3. Remote control system according to claim 2 wherein for each function unit controlled by the remote control unit, the remote control unit uses separate secret coding information for data coding by means of the coding algorithm.

4. Remote control system according to claim 1 wherein the at least one function unit has a plurality of learn mode channels for learning respective different secret coding information specifically assigned to respective ones of a plurality of transmittable remote control units.

5. Remote control system according to claim 1 wherein the DES algorithm is used as the coding algorithm.

6. Process for operating a remote control device having a portable remote control unit, at least one function unit controlled by way of the remote control unit, and a bidirectional data communication link which transmits coded data between the remote control unit and the function unit, said coded data being generated by a symmetrical coding method, said process comprising steps for usage-authorizing, outside-usage-protected, assignment of a particular portable remote control unit to a particular function unit to be controlled by the particular portable remote control unit, by means of the assignment of a common secret coding information of a symmetrical coding method used for the authentication, comprising:

- activating a learn mode in the function unit and in the remote control unit, and transmitting a learn-mode reporting signal from the remote control unit to the function unit;
- sending a learn mode acknowledgment signal from the function unit to the remote control unit upon receipt of the learn mode reporting signal;
- calculating new secret coding information by means of a coding algorithm of the symmetrical coding method as a function of a basis secret coding information and of derived secret coding information previously stored in the remote control unit, and transmitting said new secret coding information to the function unit upon receipt of the learn mode acknowledgment signal by the remote control unit;
- replacing the previous secret coding information with the received, new secret coding information in the function unit, said function unit sending an acknowledgment signal; and
- replacing the derived secret coding information previously stored in the remote control unit with the new secret coding information in the remote control unit upon receipt of the acknowledgment signal.

* * * * *